(12) United States Patent
Michael et al.

(10) Patent No.: US 11,733,879 B2
(45) Date of Patent: *Aug. 22, 2023

(54) DATA PROCESSING SYSTEM AND METHOD FOR READING INSTRUCTION DATA OF INSTRUCTION FROM MEMORY INCLUDING A COMPARISON STAGE FOR PREVENTING EXECUTION OF WRONG INSTRUCTION DATA

(71) Applicant: Winbond Electronics Corp., Taichung (TW)

(72) Inventors: Oron Michael, San Jose, CA (US); Katsutoshi Suito, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,796

(22) Filed: Oct. 14, 2022

(65) Prior Publication Data
US 2023/0035098 A1    Feb. 2, 2023

Related U.S. Application Data

(63) Continuation of application No. 17/111,527, filed on Dec. 4, 2020, now Pat. No. 11,507,282.

(51) Int. Cl.
*G06F 12/00*    (2006.01)
*G06F 3/06*    (2006.01)

(52) U.S. Cl.
CPC .......... *G06F 3/0619* (2013.01); *G06F 3/0655* (2013.01); *G06F 3/0679* (2013.01)

(58) Field of Classification Search
CPC ..... G06F 3/0619; G06F 3/0655; G06F 3/0679
USPC ........................................................ 711/154
See application file for complete search history.

(56) References Cited

U.S. PATENT DOCUMENTS

| 7,089,427 | B1 * | 8/2006 | Takata ................ A63F 13/95 463/43 |
| 7,555,787 | B2 * | 6/2009 | Clercq .................... H04L 9/003 380/287 |
| 10,067,767 | B2 * | 9/2018 | Lin ........................ G06F 9/3802 |
| 2020/0050575 | A1 * | 2/2020 | Mishra ................ G06F 13/4282 |

* cited by examiner

*Primary Examiner* — Mardochee Chery
(74) *Attorney, Agent, or Firm* — JCIPRNET

(57) ABSTRACT

In the disclosure, a data processing system includes a microprocessor and a memory. The integrity of data read from a memory by a microprocessor may be checked. When an instruction address is transmitted from the microprocessor to the memory for reading the instruction data corresponding to the instruction address, predetermined dummy data is also read from the memory while the instruction data is read. The integrity of the instruction data may be check by comparing the predetermined dummy data to a hardwire data that is not stored in the memory. If the dummy data matches the hardwire data, the instruction data read from the memory is determined to be correct.

20 Claims, 4 Drawing Sheets

DATA PROCESSING SYSTEM AND METHOD FOR READING INSTRUCTION DATA OF INSTRUCTION FROM MEMORY INCLUDING A COMPARISON STAGE FOR PREVENTING EXECUTION OF WRONG INSTRUCTION DATA

CROSS-REFERENCE TO RELATED APPLICATION

This application is a continuation application of and claims the priority benefit of U.S. application Ser. No. 17/111,527, filed on Dec. 4, 2020. The entirety of the above-mentioned patent application is hereby incorporated by reference herein and made a part of this specification.

BACKGROUND

Technical Field

The disclosure generally relates to a data processing system, and more specifically, to data processing system that loads instruction data of an instruction from a memory and a method thereof.

Description of Related Art

In a data processing system, a microprocessor may access memory (e.g., read-only memory (ROM), random access memory (RAM) or any other non-volatile memory) to load instruction data by using an instruction address. However, in many cases, the memory may be affected by various factors such as temperature, supply voltage fluctuations (e.g., voltage drop, spikes, or up/down conditions), or any other conditions that influence the output of the memory. For example, under a low voltage operation, voltage fluctuations may cause errors in the instruction data read from the memory, and wrong instruction may be executed by the microprocessor. In some cases, critical data may be erased from the memory due to an execution of wrong instruction, which causes fatal failure of the memory.

SUMMARY

In the disclosure, a data processing system and a method thereof are provided to prevent reading wrong instruction data from the memory.

In one of the embodiments, a data processing system includes a memory, a read data check circuit, and a microprocessor. The memory includes a first region and a second region, where the first region stores a plurality of instruction data and the second region stores a dummy data. The read data check circuit is coupled to the second region of the memory to receive a dummy data, and comparing the dummy data to a hardwire data. The microprocessor is coupled to the memory and the read data check circuit and configured to access the memory using an instruction address to fetch instruction data, receive the instruction data from the first region and a comparison result from the read data check circuit in response to the instruction address, and determine that the instruction data corresponds to the instruction address according to the comparison result.

In one of the embodiments, a method of reading instruction data of an instruction from a memory is provided. The method comprises the following steps. A first instruction address corresponding to a first instruction is received. A first instruction data and a first dummy data is obtained from the memory based on the first instruction address. The first dummy data is compared to a hardwire data. Then, the first instruction data is provided to the microprocessor when determined that the dummy data matches the hardwire data.

In the present invention, a comparison stage is added into an instruction pipeline of the instruction. Accordingly, the disclosure reduces the chance of executing a wrong or unintended instruction by cross check the integrity of the instruction data using the dummy data which is read at the same time (or under the same condition) as the instruction data.

BRIEF DESCRIPTION OF THE DRAWINGS

Aspects of the present disclosure are best understood from the following detailed description when read with the accompanying figures.

DESCRIPTION OF THE EMBODIMENTS

Figure 1:
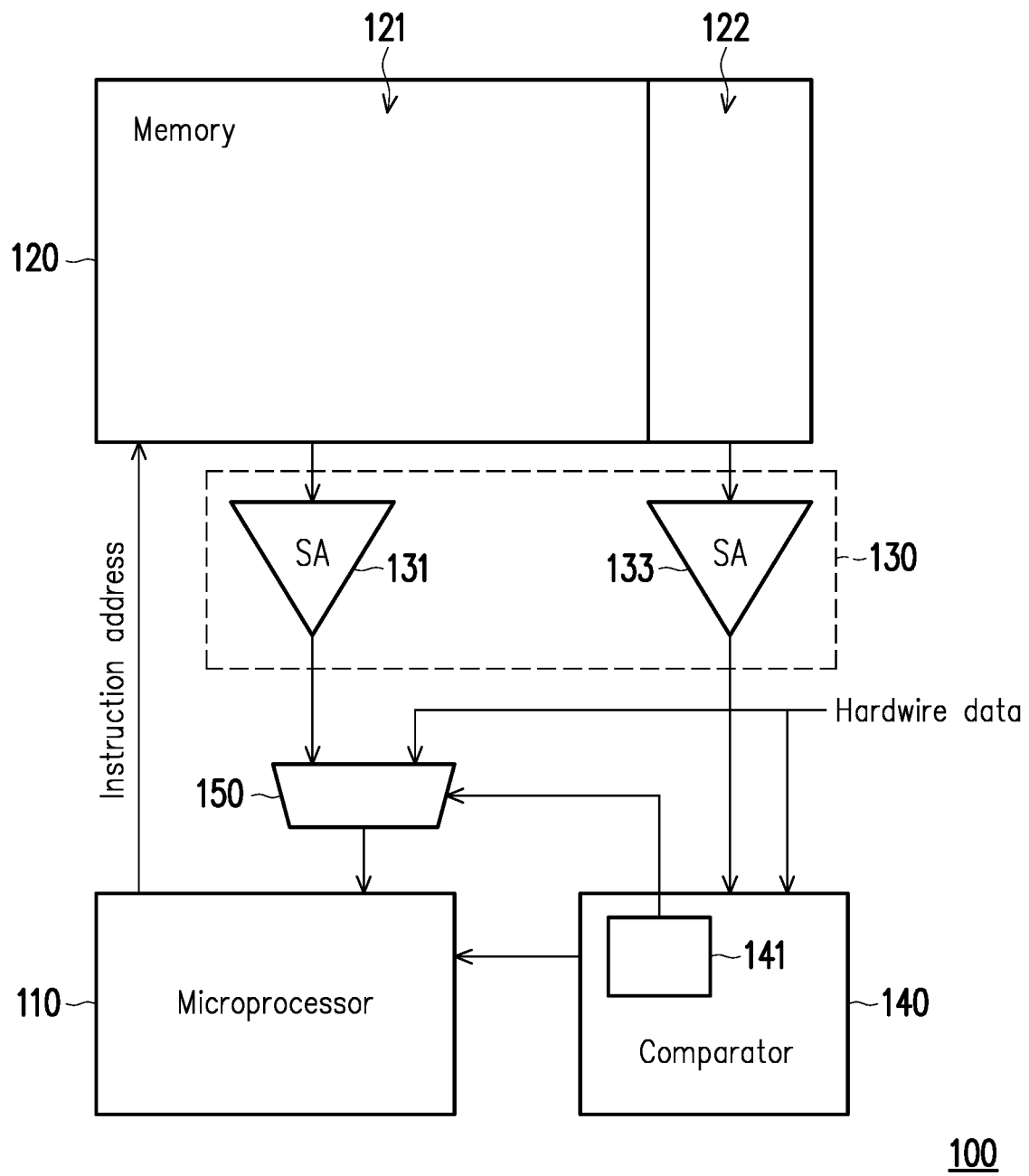
FIG. 1 is a block diagram illustrating a data processing system in accordance to one of the embodiments of the disclosure.

The following disclosure provides many different embodiments, or examples, for implementing different features of the present disclosure. Specific examples of components and arrangements are described below to simplify the present disclosure. These are, of course, merely examples and are not intended to be limiting. For example, a first feature coupled to a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In a data processing system, a microprocessor accesses a memory to obtain an instruction data according to an instruction address. Conventionally, the microprocessor would not discover nor verify whether an instruction data received from the memory is correct (i.e., corresponds to the instruction address used to access the memory), and therefore, wrong or unintended instruction may be executed. In the disclosure, a comparison stage is added into an instruction pipeline of the instruction. In detail, the access of the memory using the instruction would cause at least two data outputs from the memory. In response to the instruction address, the memory would output instruction data designated by the instruction address and a dummy data. The correctness of the instruction address (i.e., whether the instruction data corresponds to the instruction address) may be checked by using the dummy data that is also read from the memory at the same time as the instruction data. Accordingly, the disclosure reduces the chance of executing a wrong or unintended instruction by cross check the integrity of the instruction data using the dummy data which is read at the same time (or under the same condition) as the instruction data.

FIG. 1 is a block diagram illustrating a data processing system 100 according to one of the embodiments of the disclosure. The data processing system 100 includes a microprocessor 110, a memory 120, a sense amplifier circuit 130, a comparator 140 and a multiplexer 150.

In the embodiment, the microprocessor 110 is coupled to the memory 120 and the comparator 140. Furthermore, the microprocessor 110 may be coupled to an input/output device (not shown) via a bus (not shown). The memory 120 may include non-volatile memory. For example, the memory 120 may include at least one of read only memory (ROM), programmable read only memory (PROM), electrically programmable read only memory (EPROM), electrically erasable programmable read only memory (EEPROM), and flash memory such as a flash memory (NAND or NOR flash). Furthermore, the disclosure would also include flash memory having Serial Peripheral Interface (SPI) interface such as an SPI NAND flash, etc. In the present embodiment, the memory 120 may be a ROM. The memory 120 is coupled to the sense amplifier circuit 130 for data reading. In the embodiments, the memory 120 includes a first region 121 and a second region 122. The first region 121 is configured to store program codes of instructions and data that are needed for the execution of the instructions (e.g., instruction data corresponding to an instruction address). The second region 122 is configured to store dummy data that is predetermined.

In the embodiments, the dummy data may be a predetermined data having number of bits, such as a 2, 4, 8, 16, 32 bit data, and so on. The dummy data represents an expected data that is used to check the integrity of the instruction data read from the memory 120. The sense amplifier circuit 130 includes at least a first sense amplifier 131 and a second sense amplifier 133. The first sense amplifier 130 is coupled between the first region 131 of the memory 120 and the microprocessor 110 to provide the data stored the first region 131 to the microprocessor 110. The second sense amplifier 133 is coupled between the second region 122 of the memory 120 and the comparator 140 to provide dummy data stored in the second region 122 to the comparator 140.

The comparator 140 is configured to receive the dummy data and hardwire data, and configured to compare the dummy data and the hardwire data, as to determine whether any data read from the first region 121 of the memory 120 is correct during a particular access of the memory 120 according to the dummy data obtained from the second region 122 of the memory 120. That is, for each access of the memory 120, data from the first region 121 of the memory 120 and dummy data from the second region 122 may be obtained through the first sense amplifier 131 and the second sense amplifier 133, respectively. In the embodiment, the comparator 140 further includes a read fail counter 141 that tracks the number of read fail of an instruction address. When the number of read fail reaches a predetermined number of times, the read counter 141 may output a read fail signal to end the read attempt. The disclosure is not intended to limit the location of the read fail counter 141. In an alternative embodiment, a read fail counter may be external to the comparator 140 and coupled between the comparator 140 and the multiplexer 150.

In the embodiment, the hardwire data may be implemented by a logic circuit having a plurality of logic gates or switches that are programmed to represent a predetermined number of bits having a particular pattern (i.e., a sequence of 1's and 0's). In one of the embodiments, the hardwire data may have a bit pattern that is an instruction data such as flush command, reset command, clear command, or other commands that reset or clear the instruction pipeline of the microprocessor. In other embodiments, the hardwire data may be a portion of the microprocessor 110 that is specifically programmed to have the bit pattern described above.

The multiplexer 150 is coupled between the sense amplifier 130 and the microprocessor 110. The multiplexer 150 is configured to select the data obtained from the first region 121 of the memory 120 or the hardwire data as an output to the microprocessor 110 according to a read fail signal. The read fail signal may be obtained from a read fail counter 141 based on the number of read attempt. In the embodiments, the multiplexer may be configured to output the data obtained from the first region 121 of the memory 120 unless the read fail signal is set (i.e., logic 1.) However, the embodiment is not intended to limit the parity of the read fail signal for selecting the data obtained from the first region 121 of the memory 120 or the hardwire data. The logic value for selecting one of the data obtained from the first region 121 of the memory 120 or the hardwire data may be either logic 1 or 0 of the read fail signal. The read fail signal may be output by the microprocessor 110 or the comparator 140, which the embodiment is not intended to limit the origin or the generation of the read fail signal.

In an operation of the data processing system 100, the microprocessor 110 is configured to execute instructions using an instruction pipeline, in which the execution of the instruction may be decomposed to several stages such as an instruction fetch stage, an instruction decode stage, an instruction execution stage, a comparison stage and a write-back stage. The microprocessor 100 may include caches that have relatively high access rates and a translation table (such as a translation look-aside table) recording a location (i.e., an instruction address) of instruction data corresponding to an instruction. When the microprocessor 100 receives an instruction, the microprocessor 110 may access the translation table and obtain a corresponding instruction address designating an address in the memory 120. Accordingly, the microprocessor 110 access the memory 120 to obtain an instruction data by using the instruction address. The memory 120 would output the instruction data from the first region 121 of the memory 120 and the dummy data from the second region 122 of the memory 120 through the sense amplifier circuit 130 in response to the instruction address received from the microprocessor 110. The first region 121 of the memory 120 is addressable by the instruction address from the microprocessor 110, while the second region 122 of the memory 120 is not. The same dummy data stored in the second region 122 of the memory 120 should be obtained at each access of the microprocessor 110 along with the instruction data from the first region 121 of the memory 120 in response to the instruction address. However, the data read from the memory 120 may be incorrect due to the conditions described above such as voltage fluctuation that causes a read error. Under such situation, the dummy data read from the second region 122 of the memory 120 may be utilized to check the integrity of the instruction data that was read from the first region 121 of the memory 120 at the same time or in response to the same access of the memory 120. Since the dummy data is expected data that is predetermined, the data processing system 100 may compare the read dummy data to the predetermined hardwire data that is not stored in the memory 120.

If the dummy data matches the hardwire data, the data processing system 100 determines that the instruction data read from the first region 121 of the memory 120 is correct. That is, the instruction data corresponds to the instruction address that was used for accessing the memory 120. If the dummy data does not match the hardwire data, the data processing system 100 determines that the instruction data read from the first region 121 of the memory 120 is incorrect (i.e., a read error). The dummy data obtained through this first access of the memory 120 would be referred to as a first dummy data. The instruction pipeline of the microprocessor would be stalled, and the microprocessor 110 would access the memory 120 to fetch the instruction data again by using the same instruction address. It should be noted that this would be referred to a second access of the memory 120 by using the same instruction address as the first access of the memory 120. The instruction data obtained form the memory 120 during the second access of the memory 120 would be referred to as a second instruction data while the instruction data obtained during the first access of the memory 120 would be referred to as a first instruction data. Similarly, the dummy data obtained during the first access would be referred to as a first dummy data, and the dummy data obtained during the second access would be referred to as a second dummy data.

The second access of the memory 120 may include a plurality of second accesses to the memory 120. Each of the second accesses of the memory 120 would obtain a second instruction data and a second dummy data by using the instruction address. The second access of the memory 120 would be repeatedly performed until the second dummy data read from the second region 122 of the memory 120 matches the hardwire data or a maximum number of attempts is reached. The maximum number of attempts is a predetermined number of times that the microprocessor 110 would attempt to access the memory 120 using the same instruction address. When the maximum number of attempts is reached, the hardwire data would be transmitted to the microprocessor 110 instead of the (second) instruction data to end the process of reading the instruction data from the memory 120. The hardwire data may have a bit pattern represents flush command, reset command, clear command, or other commands that reset or clear or stop the instruction pipeline of the microprocessor. In detail, the read fail signal is transmitted to the multiplexer 150 (e.g., a selection input terminal of the multiplexer) that enables the multiplexer 150 to select the hardwire data as an output to the microprocessor 110. According to the hardwire data, the microprocessor would then flush, reset, clear, or stop the current instruction pipeline. Accordingly, execution of an instruction data that is erroneously read from the memory 120 may be prevented.

Figure 2:
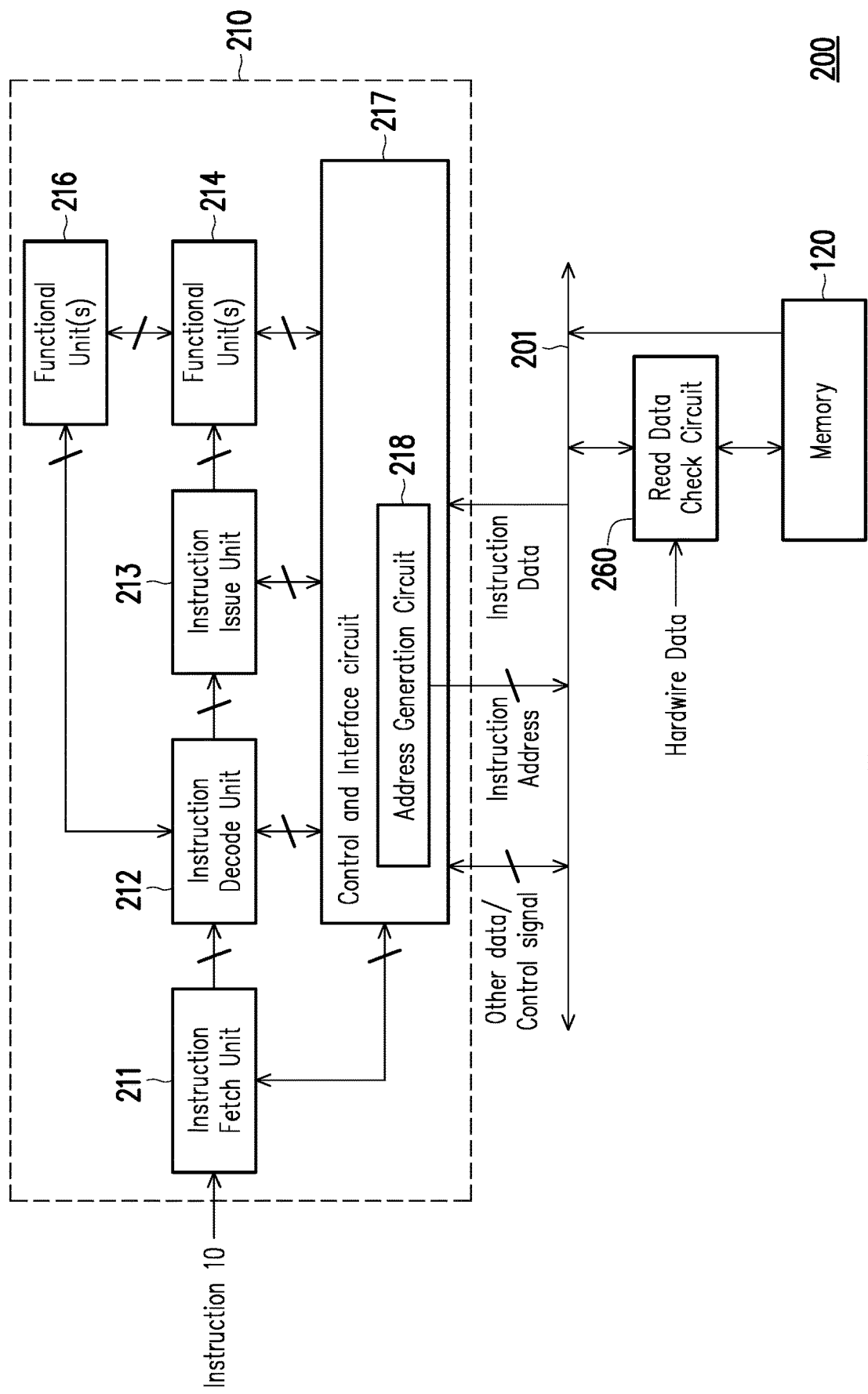
FIG. 2 is a block diagram illustrating an instruction pipeline architecture of a microprocessor in a data processor system in accordance with one of the embodiments.

FIG. 2 is a block diagram illustrating an instruction pipeline architecture of a microprocessor 210 in a data processor system 200 in accordance with one of the embodiments. In FIG. 2, the microprocessor 210 is coupled to the memory 120 through a system bus 201, where instruction address, instruction data, and other data/control signals are being transmitted between the microprocessor 210 and the memory 120 through the system bus 201. In the embodiment, a read data check circuit 260 may also be included and coupled between the microprocessor 210 and the memory 120. The read data check circuit 260 may include the comparator 140 and the multiplexer 150 as illustrated in FIG. 1, as to check the integrity of the instruction data read from the memory 120. The read data check circuit 260 receives the hardwire data (from a hardwire logical circuit for example), however, the disclosure is not intended to limited thereto. In some other embodiments, the hardwire data may be embedded within the read data check circuit 260. It should be noted that the sense amplifier circuit 130 as illustrated in FIG. 1 is also included in the embodiment illustrated in FIG. 2, where the sense amplifier circuit 130 may be disposed between the microprocessor 210 and the memory 120 or a front end of the memory 120 for reading data from the memory 120.

In the embodiment, the microprocessor 210 may include an instruction fetch unit 211, an instruction decode unit 212, an instruction issue unit 213, a functional unit(s) 214, a register file 216, a control and interface circuit 217 having an address generation circuit 218. The instruction fetch unit 211 is coupled to the instruction decode unit 212. The instruction decode unit 212 is coupled to the register file 216. The instruction issue unit 213 is coupled to the instruction decode unit 212, the functional unit(s) 214. In some embodiments, the instruction issue unit 213 may also be coupled to the register file 216. The functional unit(s) 214 is coupled to the instruction issue unit 213 and the register file 216. The control and interface circuit 217 is coupled to the instruction fetch unit 211, the instruction decode unit 212, the instruction issue unit 213, and the functional unit(s) 214, where the control and interface circuit 217 is configured to be a communication interface that provides a means of communication between the microprocessor 210 and other hardware devices such as the memory 120 through the system bus 201. In some embodiments, the control and interface circuit 217 may also be coupled to the register file 216 (not shown.)

When an instruction 10 is received by the microprocessor 210, the instruction fetch unit 211 fetches the instruction data (e.g., opcode, assembly codes of the instruction) of the instruction 10 from the memory 120 through the control and interface circuit 217. This may be referred to as the instruction fetch (IF) stage. In the embodiment, the address generation circuit 218 generates an instruction address corresponding to the received instruction 10 and transmits the instruction address to the memory 120 through the system bus 201. The memory 120 returns with the instruction data corresponding to instruction address to the microprocessor 210 through the system bus 201. Then, the instruction decode unit 212 may access the register file 216 or the memory 120 for obtaining operand data designated by the instruction 10, which may be referred to an instruction decode (ID) stage. Once the operand data are decoded, the instruction data and the corresponding operand data are transmitted to the instruction issue unit 213. In the embodiment, the instruction issue unit 213 is configured to check a comparison result between the dummy data read from the second region 122 of the memory 120 and the hardwire data, which may be referred to as a comparison (CP) stage or an instruction issue stage. The comparison result may be presented by one or more bits obtained from read data check circuit 260, which may be transmitted to the microprocessor 210 as one of the control signals. It should be noted that the comparison result may be a signal that indicates the currently fetched instruction data is correct, or a signal that indicates a subsequent instruction may be processed, the disclosure is not intended to limit the implementation of the comparison result. If the comparison result indicates that the instruction data is correct (or a subsequent instruction is allowed), the instruction data and the corresponding operand data is transmitted to the functional unit(s) 214 for execution, which may be referred to as an execution (Exec) stage. If the comparison result indicates that the instruction data is incorrect, the instruction pipeline will be stalled, and the instruction data of the current instruction would be fetched again.

Figure 3:
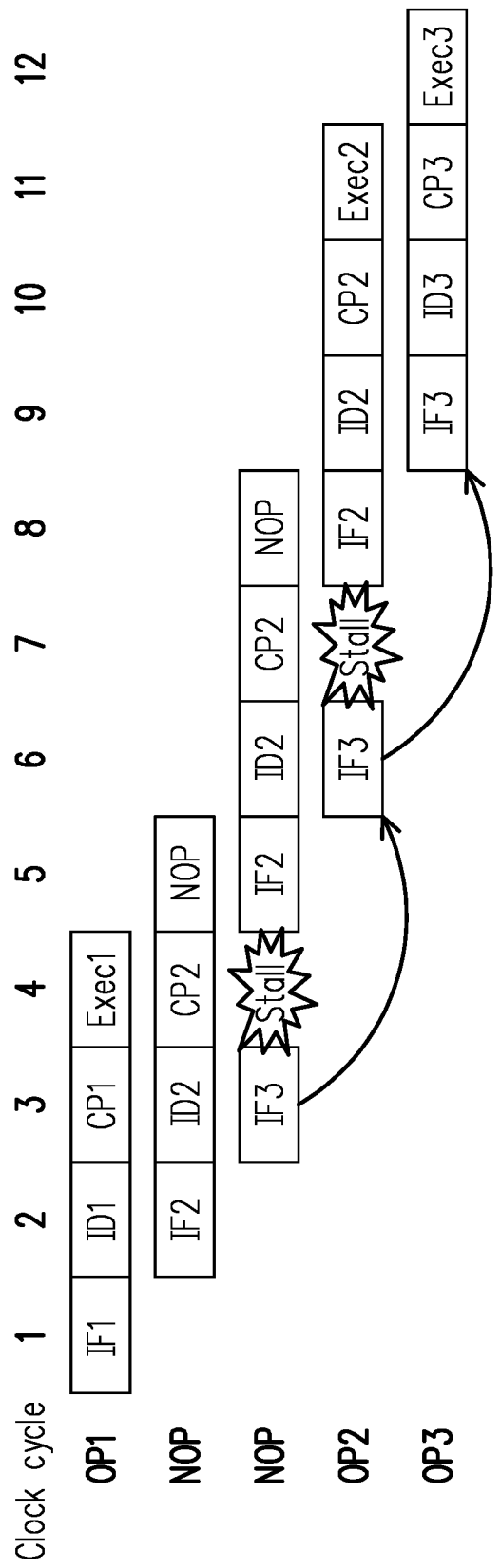
FIG. 3 is a block diagram illustrating an instruction pipeline of the microprocessor processing a plurality of instructions in accordance to one of the embodiments of the disclosure.

FIG. 3 is a block diagram illustrating an instruction pipeline of the microprocessor processing a plurality of instructions in accordance to one of the embodiments of the disclosure. FIG. 3 illustrates a timing diagram of the microprocessor 110, 210 for processing a first instruction (OP1), a second instruction (OP2), and a third instruction (OP3). In the embodiment, the referral character NOP indicates a stall where no instruction (operation) is being executed in those clock cycles. As described above, each instruction would be processed in a sequence of stages including an instruction fetch stage (IF), an instruction decode stage (ID), a comparison stage (CP), and an execution stage (EXEC). In the embodiment, the first instruction (OP1) is successfully processed through the IF stage (IF1) in a first clock cycle, ID stage (ID1) in a second clock cycle, CP stage (CP1) in a third clock cycle, and then the EXEC stage (EXEC1 in a fourth clock cycle). The second instruction (OP2) is initially fetched (i.e., IF stage, IF2) in the second clock cycle and decoded (i.e., ID stage, ID2) in the third clock cycle. The integrity of the (second) instruction data may be check in the comparison stage (CP2) in the fourth clock cycle. However, the comparison result of the second instruction indicated that the instruction data read from the memory 120 may be incorrect. In other words, the dummy data read from the second region 122 of the memory 120 at the same time as the instruction data from the first region 121 does not match the hardwire data. The microprocessor would stall the pipeline in the fourth clock cycle, and the second instruction (OP2) would be fetched again (IF2) in a fifth clock cycle. At the same time, the instruction fetch (IF3) of the third instruction would be pushed back to a sixth clock cycle.

In the embodiment, the instruction data fetch (IF2) of the second instruction fails again at the second comparison stage (CP2) of the second instruction in a seventh clock cycle. As a result, the instruction pipeline would be stalled again in the seventh clock cycle, where the second instruction fetch (IF3) of the third instruction subsequent to the second instruction would be pushed back again to a ninth clock cycle. In the embodiment, the instruction data of the second instruction would be successively read from the memory at the second try, where the instruction data fetched in an eighth clock cycle (IF2) would be determined to be correct (i.e., dummy data matching hardwire data) and executed (Exec2) in an eleventh clock cycle. Since the comparison stage (CP2) of the second instruction in a tenth clock cycle would indicate that the instruction data read from the memory s correct, the instruction data of the third instruction fetched (IF3) in the ninth clock cycle would continue to the instruction decode stage (ID3) in the tenth clock cycle, the comparison stage (CP3) in the eleventh clock cycle, and eventually the execution stage (EXEC3) in the twelfth clock cycle.

It should be noted that the microprocessor of the disclosure would continue to re-read the second instruction, stall the pipeline, and push back the instruction fetch of the third instruction (IF3) until a predetermined number of attempts (i.e. maximum number of attempts) for reading instruction data of an instruction from the memory is reached. The read data check circuit 260 may include a counter that tracks the number of times an instruction data fetched by using the same instruction address was determined to be read fail or incorrect. When the counter reaches the predetermined number of attempts, the read data check circuit 260 (e.g., multiplexer 150) would pass the hardwire data to the microprocess as the fetched instruction data instead of re-access the memory, where the hardwire data may be a command that stop, clear, reset, or flush the instruction pipeline of the microprocessor.

Figure 4:
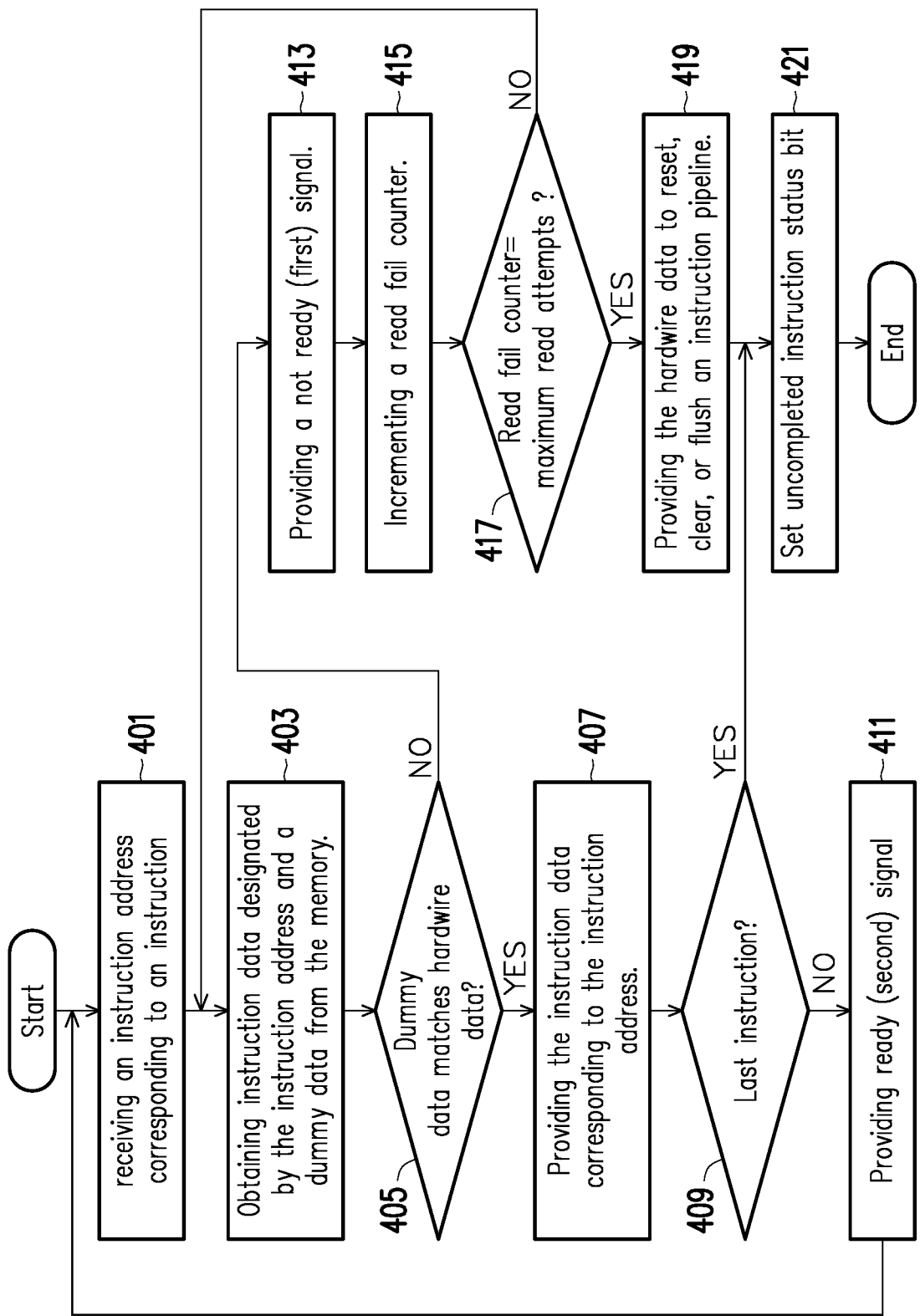
FIG. 4 is a flow diagram illustrating a process of reading data from a memory in accordance with the other embodiments of the disclosure.

FIG. 4 is a flow diagram illustrating a process of reading data from a memory in accordance with one of the embodiments of the disclosure. In the embodiment, the microprocessor may receive one or more instruction for execution, and thus the memory would be accessed to obtain instruction data corresponding to the received instruction. In step S401, an instruction address corresponding to the instruction may be received by the memory from the microprocessor. In step S403, an instruction data designated by the instruction address is obtained from a first region of the memory, and a dummy data is obtained from a second region of the memory. For example, the microprocessor fetches the instruction data by transmitted the instruction address to the memory. In response to the instruction address, the memory is accessed to obtain both the instruction data from the first region and the dummy data from the second region.

In step S405, the dummy data obtained from the second region of the memory is compared to a hardwire data. In the embodiment, the hardwire data is predetermined and not being stored in the memory. When the dummy data matches the hardwire data (i.e., "Yes" path of the step S405), the process goes to step S407. In the step S407, the instruction data corresponding to the instruction address is provided to the microprocessor. When the dummy data does not match the hardwire data (i.e., "No" path of step S405), the process goes to step S413 which would be described later.

In step S409, it is determined whether the current instruction is the last instruction. In other words, the step S409 determines whether there are other instruction addresses to process. If yes, the process goes to step S421 to set an uncompleted instruction status bit for indicating that all of the instruction data have being fetched. Then, the process is ended. On the other hand, if the step S409 determines that the current instruction is not the last instruction, the process goes to step S411. In the step S411, a ready signal (also referred to as a second signal) is provided to indicate that the memory is ready to receive the next address. In the embodiment, the ready signal may be provided from the comparator (or the data read check circuit) to the microprocessor.

Referring back to the step S405, in the case where the dummy data does not match the hardwire data (i.e., "No" path), the process goes to the step S413. In the step S413, a not ready signal (also referred to as a first signal) is provided to indicated that the memory is not ready to receive the next instruction address. In the embodiment, the not ready signal may be provided from the comparator (or the data read check circuit) to the microprocessor. In one of the embodiments, the ready signal and the not ready signal may be one bit where logic "1" and logic "0" may represent ready and not ready, respectively. In other words, the process may set and reset one bit in one of the control signal inform the microprocessor whether the memory is ready for the next instruction address.

In step S415, a read fail counter is incremented to track the number of read fail caused by one instruction address. In some embodiments, the read fail counter may be reset after a determination of the dummy data matches the hardwire data (step S405), since the instruction data corresponding to the instruction address would be provided to the microprocessor, and an instruction data corresponding to the next instruction would be processed.

In step S417, the process determines whether the read fail counter has reached a maximum read attempts. If yes, the process goes to step S419 where the hardwire data would be provided to the microprocessor (through the multiplexer) to reset, clear, or flush the instruction pipeline of the microprocessor. The process then goes to S421 to end the process by setting the uncompleted instruction status bit, since the instruction pipeline would be clear, reset, or flushed in response to the hardwire data. On the other hand, when the process determines that the read fail counter has not reach the maximum read attempts ("No" path), the process goes back to the step S403, where the same instruction address would be used to obtain another instruction data from the first region of the memory and another dummy data from the second region of the memory. In other words, if the attempt of reading the instruction data corresponding to the instruction address has not reach the maximum read attempts, the memory would be accessed again by using the same instruction address.

In one of the embodiments, the step S409 and S421 may be optional. That is, the step S407 goes directly to the step S411, and the step S419 would goes to the end of the process directly.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A data processing system, comprising:
   a memory, including a first region and a second region;
   a read data check circuit, coupled to the second region of the memory to receive a dummy data, and comparing the dummy data to a hardwire data; and
   a microprocessor, coupled to the memory and the read data check circuit, configured to access the memory using an instruction address to fetch instruction data, receive the instruction data from the first region and a comparison result from the read data check circuit in response to the instruction address, and determine whether to execute the instruction data corresponding to the instruction address according to the comparison result, wherein the hardwire data having a bit pattern represents a command to control the microprocessor.

2. The data processing system of claim 1, wherein when the comparison result indicates that the dummy data matches the hardwire data, the microprocessor determines that the instruction data received from the first region of the memory corresponds to the instruction address and fetches another instruction address of a subsequent instruction from the memory.

3. The data processing system of claim 1, wherein the microprocessor accesses the memory again using the instruction address when the comparison result indicates that the dummy data does not match the hardwire data.

4. The data processing system of claim 1, wherein the microprocessor executes a plurality of instructions using an instruction pipeline to process the instructions in an order that are received, wherein the microprocessor is configured to stall the instruction pipeline when the comparison result indicates that the dummy data does not match the hardwire data.

5. The data processing system of claim 1, wherein the read data check circuit comprises:
   a comparator coupled between the second region of the memory and the microprocessor, and
   a multiplexer coupled between the first region of the memory and the microprocessor, and configured to receive the instruction data from the first region of the memory and the hardwire data, and to select the hardwire data or the instruction data received from the memory as an output to the microprocessor according to a read fail signal.

6. The data processing system of claim 5, wherein the read fail signal is set according to a predetermined number of maximum attempts for reading the memory, and the hardwire data is selected as the output to the microprocessor to stop the execution of the instruction address.

7. The data processing system of claim 1, wherein the hardwire data is a flush instruction to flush an instruction pipeline of the microprocessor.

8. The data processing system of claim 1, further comprising
   a sense amplifier circuit, coupled to the memory, and reading the instruction data from the first region of the memory and the dummy data from the second region of the memory, wherein the instruction data is output to the microprocessor and the dummy data is output to the read data check circuit.

9. The data processing system of claim 1, wherein the microprocessor is configured to process a first instruction and a second instruction in an instruction pipeline, wherein the instruction pipeline includes an instruction fetch stage, an instruction decode stage, a comparison stage and an execution stage, wherein the comparison stage stalls the instruction pipeline and starts over the instruction fetch stage on the first instruction when the comparison result indicates that the dummy data does not match the hardwire data.

10. The data processing system of claim 9, wherein the microprocessor continues to process the second instruction when determined that the dummy data matches the hardwire data in the comparison stage of the first instruction.

11. The method of claim 1, wherein the hardwire data is predetermined and stored in a storage circuit other than the memory, and the memory is a non-volatile memory.

12. A method of reading instruction data of an instruction from a memory, comprising:
   receiving a first instruction address corresponding to a first instruction;
   obtaining, from the memory, a first instruction data and a first dummy data based on the first instruction address;
   comparing the first dummy data to a hardwire data, wherein the hardwire data having a bit pattern represents a command to control a microprocessor;
   providing the first instruction data to the microprocessor when determined that the first dummy data matches the hardwire data.

13. The method of claim 12, further comprising:
   providing the first instruction data corresponding to the first instruction address to the microprocessor when determined that the first dummy data matches the hardwire data.

14. The method of claim 12, further comprising:
   receiving an instruction pipeline including the first instruction and a second instruction arranged sequentially before receiving the first instruction address;

receiving a second instruction address of the second instruction subsequent the first instruction after determined that the first dummy data matches the hardwire data, stalling the instruction pipeline after determined that the first dummy data does not match the hardwire data.

15. The method of claim 12, further comprising:

providing a first signal to the microprocessor to indicate that the memory is not ready for a second instruction subsequent to the first instruction when determined that the first dummy data does not match the hardwire data.

16. The method of claim 12, further comprising:

incrementing a read fail counter when determined that the first dummy data does not match the hardwire data.

17. The method of claim 16, further comprising:

determining whether the read fail counter has reached a predetermined number of read attempts.

18. The method of claim 17, further comprising:

repeatedly obtaining the first instruction data and the first dummy data from the memory based on the first instruction address until the read fail counter reaches the predetermined number of read attempts.

19. The method of claim 17, further comprising:

providing the hardware data to the microprocessor when determined that the read fail counter has reached the predetermined number of read attempts.

20. The method of claim 12, further comprising:

receiving a second instruction address of the second instruction subsequent the first instruction after determined that the first dummy data matches the hardwire data.

\* \* \* \* \*